G. A. Libbey.

Key Ring.

N° 86,424.     Patented Feb. 2, 1869.

Witnesses:
Thos. Cogswell
J. B. Smith

Inventor:
G. A. Libbey

United States Patent Office.

G. A. LIBBEY, OF MILWAUKEE, WISCONSIN, ASSIGNOR TO HIMSELF AND THOMAS COGSWELL.

Letters Patent No. 86,424, dated February 2, 1869.

IMPROVED KEY-RING.

The Schedule referred to in these Letters Patent and making part of the same.

*To all whom it may concern:*

Be it known that I, G. A. LIBBEY, of the city and county of Milwaukee, and State of Wisconsin, have invented a new and useful Improvement in Key-Rings; and I do hereby declare that the following is a full, clear, and exact description thereof, which will enable those skilled in the art to make and use the same, reference being had to the accompanying drawing, forming part of this specification, in which—

Figure 1:
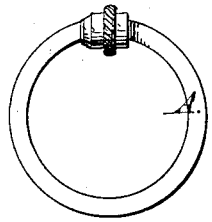
Figure 2:
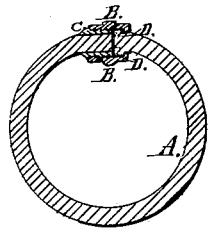

Figure 1 is a perspective view of my invention, and Figure 2, a sectional view.

Similar letters of reference in each of the figures indicate corresponding parts.

The object of my invention is to produce a key-ring, strong and convenient.

A is the wire of the ring.

B, a coupling-cover, made with one end smaller than the other, with a hole in it for the wire to pass through, with an enlargement on the end of the wire, so that it will not pull through, and in the other end a screw.

C, a screw on the end of the wire, for the coupling B to screw on to, and an enlargement on the other end of the wire.

Operation.

Turn B back, so that it will be unscrewed from C, then slip on the keys, screw B back again, and the work is done.

What I claim as my invention, and desire to secure by Letters Patent, is—

A key-ring, consisting of wire A, coupling-cover B, screw C, and enlargement D, as a new article of manufacture, substantially as described.

G. A. LIBBEY.

Witnesses:
    J. B. SMITH,
    THS. COGSWELL.